May 15, 1962

R. E. ETHIER 3,035,193

SYSTEM FOR REGULATING OUTPUT HORSEPOWER
OF A MAGNETIC COUPLING DRIVE

Filed April 19, 1960

INVENTOR
*Robert E. Ethier*

BY
*Byron, Hume, Groen & Clement*
ATTORNEYS

May 15, 1962 R. E. ETHIER 3,035,193
SYSTEM FOR REGULATING OUTPUT HORSEPOWER
OF A MAGNETIC COUPLING DRIVE
Filed April 19, 1960 2 Sheets-Sheet 2
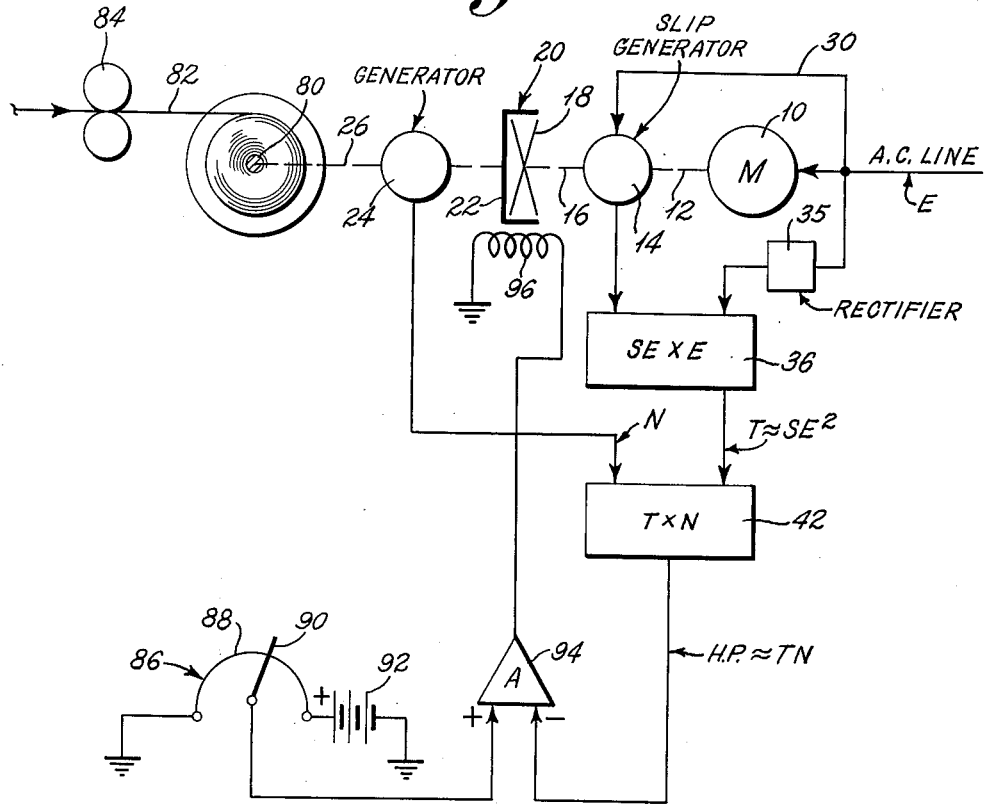
INVENTOR
*Robert E. Ethier*
BY
*Byron, Hume, Groen & Clement*
ATTORNEYS United States Patent Office 3,035,193
Patented May 15, 1962

3,035,193
SYSTEM FOR REGULATING OUTPUT HORSE-
POWER OF A MAGNETIC COUPLING DRIVE
Robert E. Ethier, Waukesha, Wis., assignor to The Louis
Allis Co., Milwaukee, Wis., a corporation of Wisconsin
Filed Apr. 19, 1960, Ser. No. 23,329
8 Claims. (Cl. 310—94)

This invention relates generally to a system for deriving an electrical signal proportional to the output horsepower of a magnetic coupling and, more specifically, to an improved system for regulating the output horsepower of a magnetic coupler.

Systems for detecting the torque of a drive motor and for regulating the output horsepower of a coupler are broadly known in the prior art. However, prior systems have used the driving motor current as a measure of motor torque, and consequently, line voltage changes altered the accuracy of such systems.

Therefore, it is the principal object of this invention to provide an improved system for measuring the output horsepower of a magnetic coupler the accuracy of which is not altered by line voltage changes.

Another object is to provide an improved system for measuring the output horsepower of a magnetic coupler wherein the product of the slip of an induction motor driving the coupling and the square of the line voltage applied to the motor are used to generate a torque signal as a measure of motor torque, this signal then being multiplied by a speed signal proportional to the output speed of the magnetic coupling to produce a horsepower signal proportional to the output horsepower of the magnetic coupler.

A specific object of this invention is to provide a magnetic coupler regulating system wherein the power transmitted through the coupler is controlled by a horsepower signal derived in the manner described above so that the amount of coupling may be regulated to a selected output horsepower.

A more specific object of this invention is to provide a constant tension-constant speed regulator for center winders and unwinders wherein the magnetic coupling through which a driving induction motor drives a winding reel is regulated to a constant output horsepower, thereby maintaining constant the tension and the speed of a material being wound or unwound by the reel.

Briefly, the foregoing objects are accomplished by providing an induction motor for driving a magnetic coupler. A slip measuring device is also driven by the induction motor to produce a slip signal proportional to the slip of the motor which in turn is a measure of the torque load on the motor. The slip signal is applied to a multiplier which produces a torque signal proportional to the product of the slip signal and to the square of the voltage applied to the motor. This torque signal is then multiplied with a speed signal proportional to the output speed of the magnetic coupler thereby providing an output signal which is proportional to the output horsepower of the magnetic coupler. This output signal is then used to regulate the amount of coupling in the magnetic coupler and thereby control its output horsepower. Such a system finds use in a constant tension regulator for center winders and unwinders where the tension and speed of the material must be maintained constant, or stated in another way the driving horsepower for the material must be maintained constant.

Further objects and features of the invention pertain to the particular structural arrangement whereby the above-identified and other objects of the invention are obtained.

The invention, both as to its structure and manner of operation, will be better understood by reference to the following specification and drawings, forming a part thereof, wherein:

FIGURE 3 shows a constant tension regulator embodying the principles of the present invention.

Figure 1:
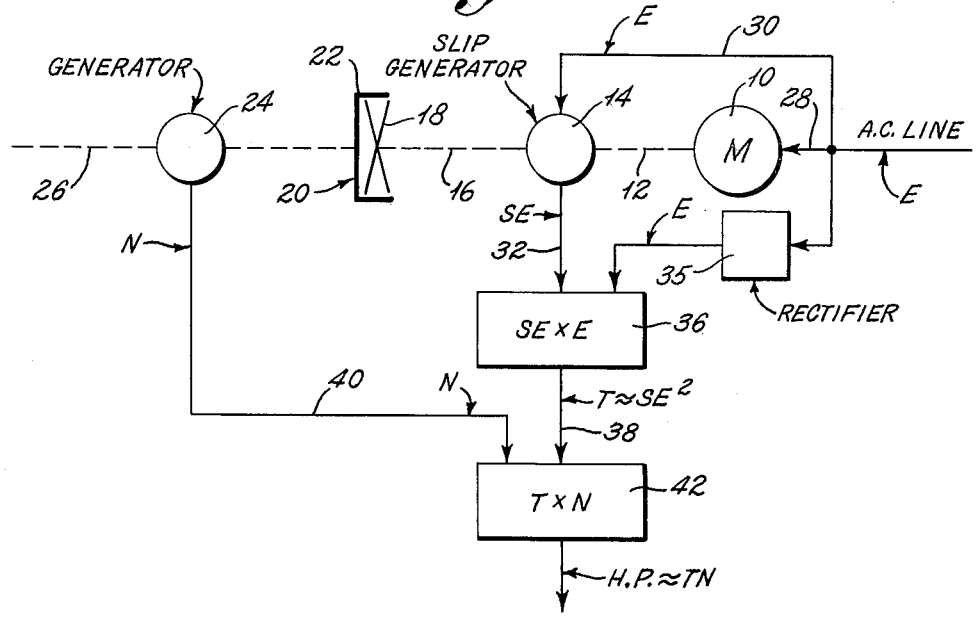
FIGURE 1 is a schematic diagram of a system for measuring the output horsepower of a magnetic coupler embodying the principles of the present invention.

With reference to the drawings, there is shown in FIGURE 1 a system for obtaining a D.C. voltage which is proportional to the output horsepower of an eddy-current coupler. A three-phase A.C. induction motor 10 has an output shaft 12 rigidly connected to a slip generator 14 so that the motor and generator rotate at the same speed. Slip generator 14 has its output shaft 16 rigidly connected to the input driving member 18 of an eddy-current coupler 20. The driven output member 22 of coupler 20 is rigidly connected to a tachometer generator 24 whose output shaft 26 drives any desired load.

Now the electrical relationships of the various components will be described. A three-phase A.C. line voltage E is applied via line 28 to the field of induction motor 10 and simultaneously via line 30 to the input of slip generator 14. With such an arrangement, the output voltage SE appearing on output line 32 of generator 14 is proportional to the product of the line voltage E and the slip S of induction motor 10.

Slip voltage SE is applied along lines 32 to the input of a multiplier 36 and the line voltage E is applied via a line 34 and a rectifier 35 to the multiplier 36. The output voltage of multiplier 36 appears on line 38 and is proportional to the product of the induction motor slip and the square of the line voltage. The output voltage of multiplier 36 may be termed a torque signal T since this voltage is proportional to $SE^2$ which in turn is proportional to the torque of induction motor 10.

Since tachometer generator 24 is rigidly coupled to the driven member 22 of eddy current coupling 20, its D.C. output voltage N is proportional to the speed of the output shaft 26. Signal N is applied along line 40 to the input of a second multiplier 42. In like manner, signal T is applied along line 38 to the input of multiplier 42. The D.C. output voltage of multiplier 42 is proportional to the product of signal T and signal N and, consequently, proportional to the horsepower delivered to the load by output shaft 26.

The advantage of this system is that changes in line voltage E do not alter system accuracy as is the case in other systems which use motor current as a measure of motor torque. The torque signal devised in this system is far more sensitive to line voltage changes. The basic formula for the torque T of an inductive motor is:

$$T \approx S \cdot E_R \cdot e \cdot K$$

where S is slip, $E_R$ is the rated line voltage, e is the variation factor in the rated line voltage such as 1.1% or 0.99% of a rated value, and K is a constant. The term $E_R \cdot e$ would be equal to the actual line voltage E. If E is squared, the magnitude of the variation factor in the torque formula will be increased. It is assumed that line voltage E varies from 1.1% to 0.99% of its rated or base value $E_R$, then when E is squared, the variation factor e will vary from 1.2 to 0.98, thus providing a torque signal more sensitive to changes in line voltage. Of course, the base line voltage $E_R$ is also squared, but this may be compensated for by decreasing the constant K.

Figure 2:
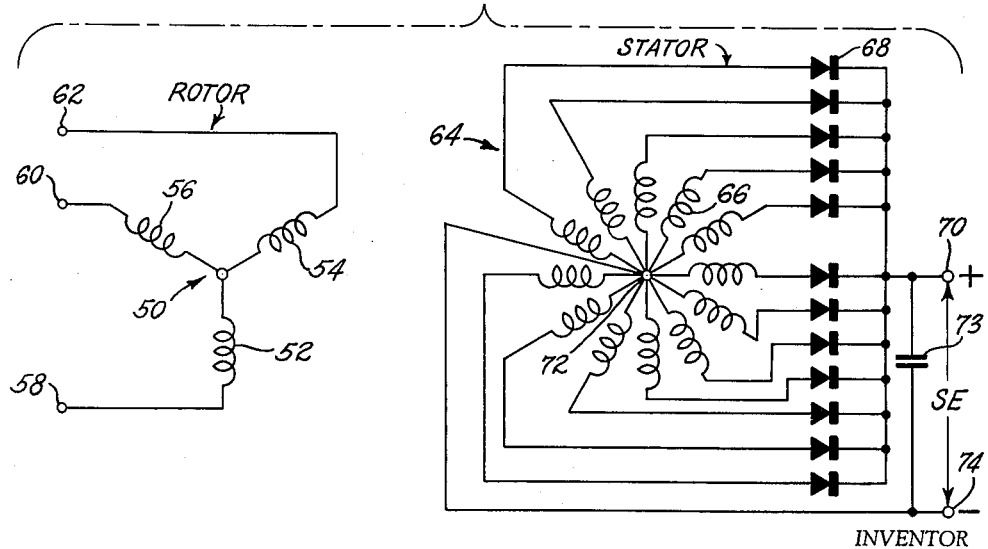
FIGURE 2 is a schematic diagram of a preferred slip generator used in the system of FIGURE 1.

FIGURE 2 shows a schematic diagram of an actual structure for slip generator 14. A three-phase rotor 50 has three windings 52, 54 and 56 each having an input terminal 58, 60 and 62, respectively. A 12-phase stator 64 acts as the field for slip generator 14 and has twelve windings each identified by the reference character 66 each having an associated series connected rectifier 68. The output sides of these rectifiers are all connected in common to a positive output terminal 70 while the common connection 72 for the windings 66 is connected to the negative output terminal 74. A charging capacitor 73 is connected across the output terminals for maintaining an average output signal. Slip generator output signal SE is taken across capacitor 73 at terminals 70 and 74.

It can be appreciated that the arrangement shown in FIGURE 2 acts as a frequency converter to provide a D.C. voltage at terminals 70, 74 which is proportional to the slip of induction motor 10. Such a result is achieved by connecting rotor 50 rigidly to the rotor of motor 10 so that they both rotate at the same speed. The A.C. line voltage E is applied both to the motor field and to the rotor 50 of the slip generator 14. Rotor 50 is rotated in the direction opposite to the rotating A.C. field established by voltage E. With such an arrangement, when the motor is rotating at synchronous speed, the rotor appears stationary to stator so that there is no output signal at terminals 70, 74. However, when slip occurs, the motor rotates more slowly than the rotating A.C. field, and therefore, there is induced in the stator windings 66 of slip generator 14 an A.C. voltage whose amplitude is proportional to line voltage E and whose frequency is proportional to the slip. Rectifiers 68 in conjunction with the charging capacitor 73 provide a voltage signal SE which is proportional to both the line voltage and to the slip.

Alternative to the arrangement shown in FIGURE 2, the slip generator may be had with a non-excited wound rotor. In this arrangement, A.C. line voltage is applied only to the motor field so as to generate a field in the direction of rotor rotation. At synchronous speeds there is no output signal, but when slip occurs, the output terminals 70 and 74 produce an output which, as with the arrangement of FIGURE 2, is proportional to both the line voltage and to the slip.

FIGURE 3 shows a schematic diagram of an automatic output horsepower regulator for a magnetic coupler drive system for a constant tension winder. Since the basic system shown in FIGURE 1 is also included in FIGURE 3, the same reference characters have been used to identify corresponding elements. Once again induction motor 10 drives slip generator 14 which in turn drives the input driving member 18 of eddy current coupling 20. The output driven member 22 drives tachometer generator 24 whose output shaft 26 drives a winder reel 80. A web material 82 passing between guide rollers 84 may be wound or unwound by winder 80. However, it is essential that the tension on web 82 and the speed of the web be maintained at predetermined constant values or horsepower. Such a value is determined by horsepower adjuster 86 which takes the form of a potentiometer having a resistance element 88 and a wiper arm 90.

Element 88 is connected across a D.C. voltage source 92 so that the voltage tapped off by the wiper arm 90 varies from zero to the positive voltage of the source. The position of wiper arm 90 determines the horsepower to be applied to web 82. The positive D.C. voltage corresponding to the position of wiper arm 90 is applied to the input of an amplifier 94. Multiplier 42 is so designed that its output signal TN is negative and is applied in opposition to the wiper arm positive voltage to amplifier 94. Amplifier 94 may be a magnetic amplifier of the difference type which provides an output proportional to the difference in magnitude between its two inputs. When the two inputs to amplifier 94 are at a selected difference potential which might be zero or any positive or negative voltage, the horsepower called for by the setting of wiper arm 90 is being applied to web 82.

Giving consideration to the operation of the system in FIGURE 3, the tension in and the speed of the web is controlled by controlling the horsepower applied thereto through the winder reel 80. As the web is wound on the reel for the condition of constant web tension, reel torque increases because of increasing torque arm. At the same time for constant web speed, the rotational speed of the reel decreases because of increasing reel circumference. It is true that the rate of change in reel torque is inversely proportional to the rate of change in rotational speed of the reel so that the product of reel torque and reel speed, which is horsepower, is constant at any time. The same principles apply to unwinding of a web from a reel. As material is unwound from the reel for constant web tension, reel torque decreases and for constant web speed, reel rotational speed increases. Again the rate of change in reel torque is inversely proportional to rate of change in reel rotational speed so that their product at any time is constant.

In the coupler 20 and within its normal coupling range, the ratio of torque input to torque output remains substantially constant even though the slip or the ratio of the speeds between the input driven member 18 and the output driven member 22 may change. The ratio of input to output speeds is controlled by controlling the energization to the winding 96 and thereby the horsepower to the output shaft 26. The greater the energization to the winding 96, the greater the coupling and the greater the horsepower transmitted through the coupler.

Considering the torques in the system between the reel 80 and the motor 10, and assuming an initial torque load condition at the reel 80 and a specific setting of the horsepower adjuster 86, the motor will be operated at a corresponding torque load detectable by the armature slip therein and in the slip generator 14 and the coupler 20 will be energized so as to produce the requisite coupling therein so as to provide at the amplifier 94 the selected difference signal between the signal from the multiplier 42 and the signal from adjuster 86. The system always tends to the condition of balance between the horsepower signal TN and the D.C. voltage tapped off by the wiper arm 90 of the horsepower adjuster 86.

As the torque load changes thereafter, as by increasing in the case of a winder reel or as by decreasing in the case of an unwinder reel, a corresponding change occurs in the slip at the motor 10 and the slip generator 14. Assuming an increasing torque load of a winder reel, the output of the slip generator 14 and the multiplier 36 increases also. Initially, the output of the generator 24 does not change so that the output of the multiplier 42 will tend to increase also—indicating an increase in horsepower applied to the drive shaft 26. At the amplifier 94 a condition of unbalance is presented which modifies the output of the amplifier 94 to decrease the energization to the field winding 96. Thus the speed of the output shaft 26 decreases and with it the output of the generator 24 until balance is again achieved at the input to amplifier 94.

When the value of the wiper arm voltage exceeds TN, the output of amplifier 94 increases, thereby increasing the energization to winding 96. The resulting increased shaft speed raises the output of the generator 24 until signal TN once again equals the voltage on wiper arm 90 to restore equilibrium at the output horsepower called for by horsepower adjuster 86. If the web tension or web speed attempts to deviate from this set value, this system automatically regulates the output of the magnetic coupler at constant output horsepower to maintain composite web tension and web speed at the set horsepower value. If it is desired to readjust web tension and speed to a lower value, wiper arm 90 is moved toward ground voltage so that signal TN exceeds the wiper arm voltage. This condition reduces the output of amplifier 94 and the energization to winding 96 so that the input to output speed ratio in the coupler 20 is reduced. Web tension and speed are consequently reduced towards the value called for by wiper arm 90 so as to attain the condition of balance and constant tension.

This system is not restricted to a slip generator whose output signal is proportional to the product of slip S and line voltage E. A slip voltage may also be developed which is independent of the line voltage; however, then an additional multiplier must be used to obtain the product of slip and the line voltage.

While there have been shown and described and pointed out the fundamental novel features of the invention as applied to the preferred embodiment, it will be understood that various omissions and substitutions and changes in the form and details of the device illustrated and in its operation may be made by those skilled in the art without departing from the spirit of the invention. It is the intention, therefore, to be limited only as indicated by the scope of the following claims.

What is claimed is:

1. A system for obtaining a signal proportional to the output horsepower of a magnetic coupler drive arrangement including a magnetic coupling having a driving input member and a driven output member, an induction motor coupled to said driving member, and means for applying an A.C. voltage to said motor, said system comprising first sensing means for producing a first signal proportional to the slip of said motor, first multiplying means for producing a second signal proportional to the product of said first signal and the square of said A.C. voltage, second sensing means for producing a third signal proportional to the speed of said driven member, and second multiplying means for producing an output signal which is proportional to the product of said second and third signals and thereby to the output horsepower of said magnetic coupling.

2. A system as defined in claim 1 further comprising means for controlling the magnetic coupling in said coupler and means for applying said output signal to said controlling means to regulate said coupling at constant output horsepower.

3. In a magnetic coupling drive arrangement including a magnetic coupler having a driving input member and a driven output member and a field winding for controlling coupling therebetween, an induction motor coupled to said driving member, and means for applying an A.C. voltage to said motor, a regulating system comprising a first sensing device for producing a first signal proportional to the product of said A.C. voltage and the slip of said motor, first multiplying means connected to said first sensing means for producing a second signal proportional to the product of said first signal and said A.C. voltage, second sensing means for producing a third signal proportional to the speed of said driven member, second multiplying means, means for applying said second and third signals to said second multiplying means to produce an output signal proportional to the product of said second and third signals, and means for applying said output signal to said field winding to control the coupling between the members of said coupler, thereby regulating the output horsepower from said magnetic coupler.

4. A regulating system as defined in claim 3 wherein said first sensing means is a slip generator driven by said motor and said second sensing means is a tachometer generator driven by said driven output member.

5. A system for regulating the output horsepower of a magnetic coupler drive arrangement including a polyphase induction motor for driving a load through a magnetic coupler, said coupler having a driving input member and a driven output member and a field winding for controlling the magnetic coupling between said members, and means for applying a polyphase voltage to said induction motor, said system comprising a slip generator driven from said induction motor with the driving input member of said magnetic coupler having an input and an output, means for applying said polyphase voltage to said input thereby producing at said output a first signal proportional to the product of the slip of said motor and said polyphase voltage, first multiplying means, means for applying said first signal and said polyphase voltage to said first multiplying means to produce a second signal proportional to the product of said slip and the square of said polyphase voltage and thereby to the torque of said motor, a second multiplying means, a tachometer generator driven by said driven output member to produce a third signal proportional to the speed of said output member, means for applying said second and third signals to the input of said second multiplying means to produce an output signal proportional to the product of said second and third signals and thereby to the output horsepower of said magnetic coupler, and means for regulating the energization to said field winding in accordance with said output signal thereby to regulate the output horsepower from said coupler to said load.

6. An automatic horsepower control system for maintaining a substantially uniform product of tension and speed on a web being wound or unwound from a reel, said system comprising an electromagnetic coupler having a driving element and a driven element and a field winding for effecting coupling therebetween so that the rate at which power is distributed to the driven element is controlled in accordance with the energization provided to the field winding, a synchronous induction motor having an output shaft rigidly coupled to said driving element, a frequency converter driven by said motor shaft, means for applying a polyphase voltage to said motor and to said converter to drive said motor and produce a first D.C. signal proportional to the product of said A.C. voltage and the slip of said motor, a first multiplying means, means for applying said polyphase voltage and said first D.C. signal to said multiplying means to produce a torque signal proportional to the torque of said motor and of said driving element and of said driven element, a tachometer generator driven by said driven member and producing a D.C. speed signal proportional to the speed of said driven member, second multiplying means, means for applying said torque signal and said speed signal to said second multiplying means to produce a D.C. horsepower signal, web adjusting means for producing a D.C. adjusting signal corresponding to a predetermined desired speed and tension product, an amplifier, means for controlling the output of said amplifier in accordance with the magnitude and polarity of difference between said horsepower signal and said adjusting signal to produce a D.C. field signal at the output thereof, and means for applying said field signal to said field winding to regulate the coupling between the elements in said coupler so as to maintain the output horsepower constant relative to said adjusting signal, thereby maintaining a substantially uniform product of tension and speed on the web.

7. An automatic horsepower control system as defined in claim 6 wherein said frequency converter comprises a rotor carrying thereon armature windings, a stator carrying thereon field windings, and rectifying means connected to said stator field windings, and wherein said rotor is driven by said motor, said polyphase voltage is coupled to said armature windings to establish a rotating field rotating in a direction opposite to that of rotor rotation, and said first D.C. signal is taken from said rectifying means.

8. A system for obtaining a signal proportional to the output horsepower for a magnetic drive arrangement including a magnetic coupling having a driving input member and a driven output member, an induction motor coupled to said driving means, means for applying an A.C. voltage to said motor, said system comprising first motor slip sensing means for producing a torque signal proportional to the slip of said motor, second sensing means for producing a speed signal proportional to the speed of said driven member, and multiplying means for producing an output signal which is proportional to the product of said torque signal and said speed signal and thereby proportional to the output horsepower of said magnetic coupling.

References Cited in the file of this patent

UNITED STATES PATENTS

| | | |
|---|---|---|
| 2,469,706 | Winther | May 10, 1949 |
| 2,702,872 | Jaeschke | Feb. 22, 1955 |
| 2,949,249 | Gravenstreter | Aug. 16, 1960 |